United States Patent [19]

Gillet et al.

[11] 4,020,371
[45] Apr. 26, 1977

[54] ELECTRIC ROTATING MACHINE HAVING A CRYO-INDUCTOR

[75] Inventors: Roger Gillet, Belfort; Michel Berthet, Gif sur Yvette; Francois Moisson-Franckhauser, Bretigny, all of France

[73] Assignees: Societe Generale de Constructions Electriques et Mecaniques (ALSTHOM), Paris Cedex; Electricite de France, Paris, both of France

[22] Filed: Apr. 15, 1975

[21] Appl. No.: 568,238

[30] Foreign Application Priority Data

Apr. 17, 1974 France .......................... 74.13314

[52] U.S. Cl. ............................ 310/52; 310/261
[51] Int. Cl.² ................................ H02K 9/00
[58] Field of Search ............... 310/52, 67, 40, 10, 310/54, 165, 201, 205, 261, 264, 265; 336/55, 57, 59, 60, DIG. 1

[56] References Cited

UNITED STATES PATENTS

| | | | |
|---|---|---|---|
| 3,242,418 | 3/1966 | Mela | 310/10 |
| 3,644,766 | 2/1972 | Hughes | 310/40 |
| 3,648,082 | 3/1972 | MacNab | 310/54 |
| 3,679,920 | 7/1972 | MacNab | 310/40 |
| 3,742,265 | 6/1973 | Smith | 310/52 |
| 3,764,835 | 10/1973 | Luck | 310/52 |

*Primary Examiner*—R. Skudy
*Attorney, Agent, or Firm*—Sughrue, Rothwell, Mion, Zinn & Macpeak

[57] ABSTRACT

An electric rotating machine whose inductor operates at very low temperature and is separated from the rotor by an empty space, characterized in that a reflector screen constituted by a layer of thermally conductive strips connected together at their axial ends by thermally conductive connection parts to a cooled structure, is inserted in that empty space.

12 Claims, 6 Drawing Figures

ELECTRIC ROTATING MACHINE HAVING A CRYO-INDUCTOR

The present invention concerns an electric rotating machine whose inductor operates at very low temperature, for example that of liquid helium or of liquid hydrogen, so that, for example, the induction winding constituted by a superconductive alloy be at a temperature less than the critical temperature of that alloy, whereas the rotor of the electric generator is at a noncryogenic temperature, for example equal to or higher than the ambient temperature.

It has already been proposed to produce an electric machine having a superconductive inductor placed in the rotor of the machine. As superconductors at present found in trade cannot withstand the alternate inductions of the rotor winding, the result of this is the use of a stator called a hot stator, operating at a temperature equal to or higher than the ambient temperature ($T \geq 300$ K approximately) and of a rotor called a cold rotor, containing the inductor winding at a temperature close to or lower than the critical temperature of the superconductors used. By way of an indication, the temperature of the inductor winding can be comprised between 3° and 5° K for superconductors basically containing Niobium-Titanium or at higher temperatures for more favorable superconductors (Nb3-Sn, V3-Ga, or any others being experimented or which may be found subsequently).

The inductor is then thermally insulated from the rotor by an empty space limited by two coaxial cylindrical rotating parts: a cold cylindrical part close to the inductor, which can, moreover, constitute the support of the inductor and a hot cylindrical part further away from the inductor, these two parts being joined together in a fluid-tight manner at their axial ends.

In that case, it is an advantage for the said hot cylindrical part to be made of a non-magnetic material fulfilling the function of an electromagnetic screen, that screen functioning at a temperature close to the ambient temperature or even at a temperature which is clearly lower but remaining, however, clearly higher than the service temperature of the superconductors. That hot screen ensures good filtering of the periodical components of the induction coming from the stator and good protection of the superconductors. The corresponding losses which appear therein are removed at the ambient temperature, or at least at a temperature clearly higher than that of the superconductors, this constituting a clear economic advantage because of the value of the corresponding performance factor of the refrigeration of the rotor.

That hot screen, separated from the support inductor of the superconductors by a thorough vacuum, will send out to the superconductors only a few thermal losses by gaseous convection or by solid conduction because of the absence of radial contacts between these two concentric bodies. On the other hand, losses could reach the inductor by radiation. That is why it appeared to be an advantage to install, between the (relatively) hot outside screen and the support of the superconductors inside, an intermediate coaxial thermal screen fulfilling the function of a thermal reflector having an intermediate temperature. The radiation between two bodies at a temperature T1 and T2 being a function of the difference: ($T1^4 - T2^4$), the advantage of such a screen is quite plain.

But a thermal screen having a low temperature would be very active as an electromagnetic filter or screen if arrangements which are also the object of the present invention were not made to prevent that and the result of this is losses at low temperature, it being required to avoid this with a double aim of economy and simplicity of the heat-bearing cryogenic fluid supply system. The present invention has as its object, a rotating electrical machine whose very low temperature inductor is thermally insulated from the rotor by a space subjected to a vacuum, limited by a cold cylindrical part close to the inductor and a coaxial hot cylindrical part further away from the inductor, these two cylindrical parts being connected together in a fluid-tight manner at their axial ends, characterized in that an intermediate reflector screen fixed at its axial ends to the said cold cylindrical part by thermally conductive connecting parts and comprising at least one layer of separate thermally conductive strips, arranged parallel to one another between one axial end and the other axial end of the reflector screen is inserted in that space.

To summarize, the present invention provides for a thermal reflector screen not acting essentially as an electromagnetic filter but essentially as a coaxial reflector screen and accomodated between an outside (relatively) hot electromagnetic screen and an inside cold body accomodating the superconductive inductor.

With reference to the accompanying diagrammatic figures, examples of embodiment of the invention, having no limiting character, will be described, numerous variants being possible with the technological embodiment means without going beyond the scope of the invention and these examples will enable other characteristics of the invention to be made apparent.

Figure 1:
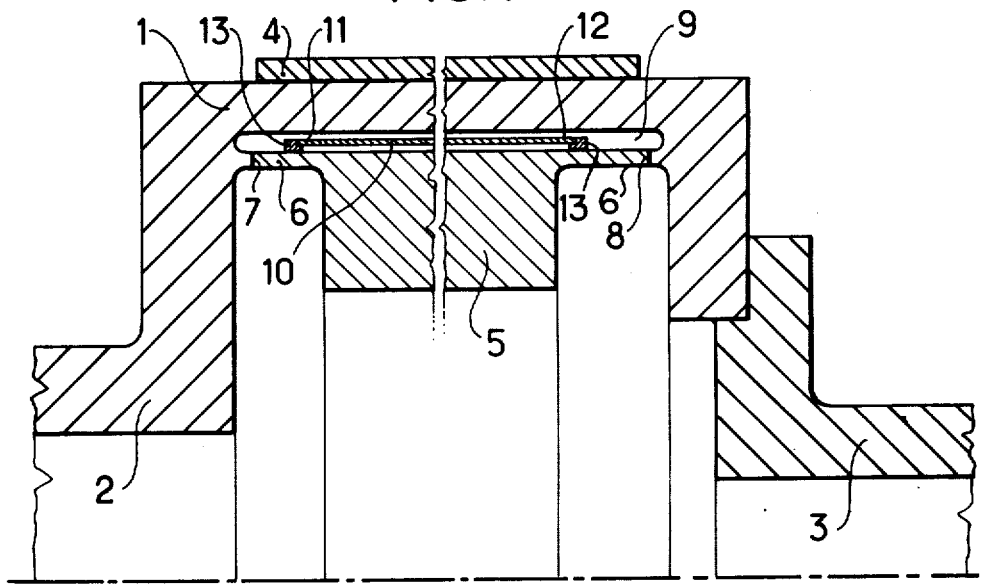
FIG. 1 is an axial half cutaway view of a rotor of an electric generator having an inductor winding.

The rotor according to FIG. 1 comprises a thick outside cylinder 1 connected at its ends to two shaft portions 2 and 3, that cylinder 1 simultaneously fulfilling function of an electromagnetic screen and of a mechanical bearer structure. The cylinder 1 is at the ambient temperature or, at least, at a noncryogenic temperature. It is provided, at its peripheral part, with a shock absorber 4. The inductor, not shown in detail, is comprised in a structure designated as a whole by the reference numeral 5 and being at a cryogenic temperature. The cylindrical inductor structure 5 has axially extending cylindrical portions 6 fixed at their opposite axial ends 7 and 8 (respectively) in a fluid-tight manner to the cylinder 1, so that a cylindrical space 9 subjected to a thorough vacuum separates the rotor cylinder 1 and the cylindrical rotor structure 5.

According to the invention, an intermediate reflector screen 10, connected at its axial ends 11 and 12 to the cylindrical portions 6 by conductive rings 13, made of copper, for example, assembled tight on the portions 6 and, possibly, fixed by light soldering, have been inserted in that space 9.

Figure 2:
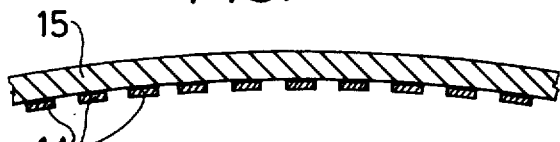
FIGS. 2 and 3 are transversal cutaway views of two variants of a reflector screen installed in the rotor of the electric generator.

The screen 10 is essentially constituted by at least one layer of conductive metallic strips 14, made of copper or aluminium, preferably, possibly nickelplated. These strips 14, have, to great advantage, a width comprised between 5 and 20 mm and a thickness comprised between 1 and 5 mm. They can be cemented to the inside of a band 15 as shown in FIG. 2. That band has been assumed to be made of stainless steel and its thickness is about 1 cm, but it could also be constituted by a compound material formed by mechanically resistant fibres such as glass fibres and of a synthetic resin such as an epoxyde resin. If the band 15 is made of stainless steel, the strips 14 are fixed thereto by an electrically insulating cement; they can also be coated with a layer of enamel, this leaving all liberty for the cementing method.

Figure 3:

In the example in FIG. 3, the strips 14 are cemented to one another in the tangential direction, an electrical insulation 16, which can be constituted by the cement itself and/or by a layer of enamel whose strips are then coated, being inserted between them. In the radial direction, the set of strips 14 is inserted between two coaxial cylinders constituted by a compound material formed by fibres which are mechanically resistant and of a synthetic resin: an inside cylinder 17 which acts as a base for laying the strips 14 and an outside cylinder 18 which has a mechanical banding function.

Figure 4:
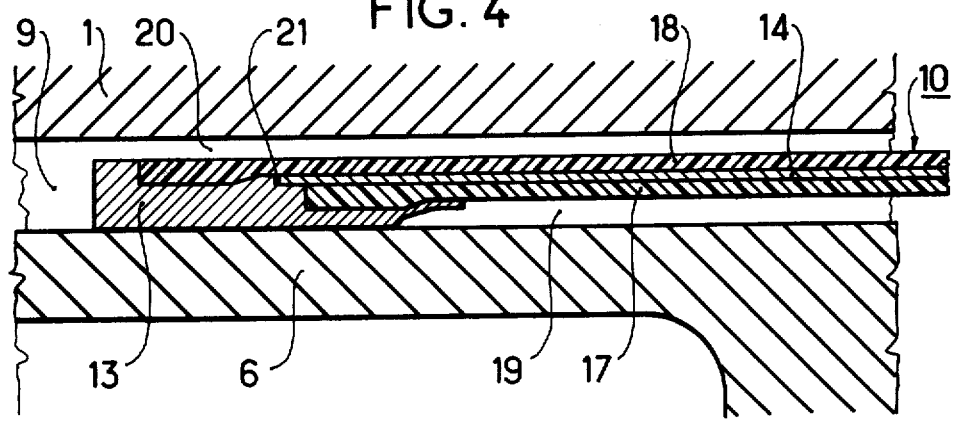
FIG. 4 shows an axial partly cutaway view, on a larger scale than that in FIG. 1 of one end of the rotor.

In FIG. 4, it has been assumed that the reflector screen was in compliance with that shown in FIG. 3. It will be seen that this screen separates the empty space into two empty zones: the one, 19, inside, the other 20, outside. The strips 14 are welded at their axial ends 21 on the rings 13, for example by a welding method having focussing of energy such as the method by electronic bombardment. The cylinders 17 and 18 are cemented to their axial ends onto the rings 13.

Figure 5:
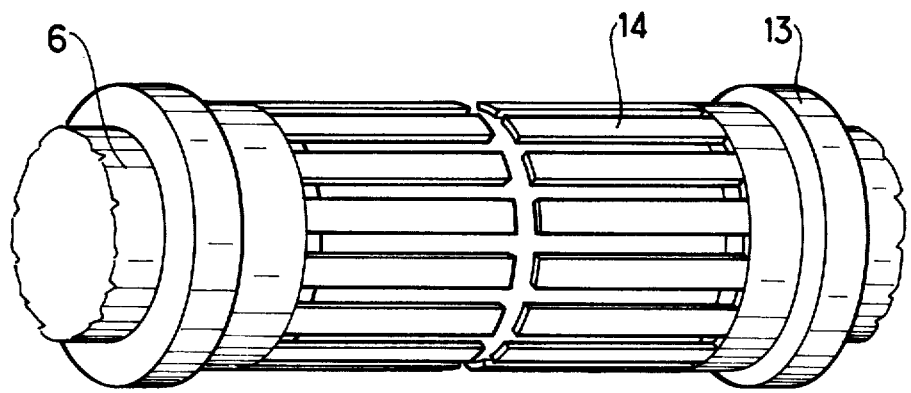
FIGS. 5 and 6 are perspective views of two additional variants of a reflector screen embodying the invention.

The strips 14 lead towards their axial ends the heat which they have received from the cylinder 1 and protecting thus axially the inductor, against the bringing in of outside energy. They can be arranged parallel to the axis of the electrical machine, this constituting the shortest heat path, but they are then, to great advantage, interrupted at a point, preferably in the middle of their length as shown in FIG. 5 with cylinder 18 removed, to prevent them from forming closed loops and thus act as an electromagnetic screen. That disadvantage can also be avoided, but not to such great advantage, by fixing them to the rings 11, an electrically insulating layer constituted, for example, by a cement and/or a layer enamel being inserted between them.

Figure 6:
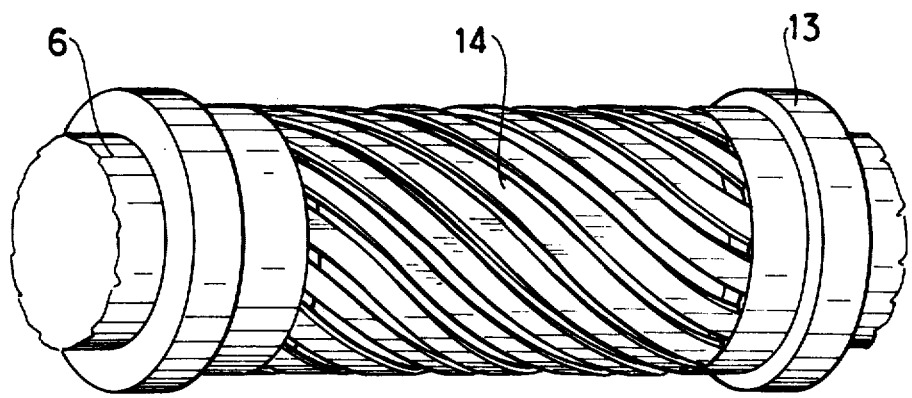

The strips 14 can also be arranged in a helical configuration as shown in FIG. 6 with cylinder 18 removed, this lengthening the heat path, but making it possible to avoid cutting them, more particularly if a screw pitch at least equal to a polar pitch of the electric machine is selected from one axial end to the other axial end of the reflector screen.

The inductor structure 5 being at a cryogenic temperature and the cylinder 1 being at a non-cryogenic temperature, are connected together by cylindrical portions 6 subjected to a thermal gradient and transmitting the mechanical couple relating to the electric machine. The thickness of the cylindrical portions 6 is minimized in order to reduce the heat flux coming from the ends 7 and 8 at a non-cryogenic temperature.

Each cylindrical portion 6 can comprise, over a part or all of its length, an exchanger, not shown in FIG. 4, in which a flow of cryogenic fluid makes it possible to reduce the flow of heat by conduction at the cold end of the cylindrical portion.

A variant not shown in FIG. 4 consists in accomodating exchangers in the rings 13, these exchangers ensuring simultaneously the dissipating of the heat collected by the thermal screen as well as the heat transmitted by conduction from the ends 7 and 8.

The position at which the rings 13 of the thermal screen are fixed on the cylindrical portions 6 of the shaft is determined so as to make it possible to dissipate by radial conduction in the rings 13 the radiation collected by the thermal screen towards the cooled cylindrical portions 6 while minimizing the frigorific power necessary for keeping the inductor at the required cryogenic temperature. The thickness of the strips 14 in which the longitudinal thermal conduction and the nature of the metal having high thermal conductivity used for the strips 14 make it possible to limit the difference in temperature in the thermal screen between its middle plane and the end planes 11 and 12.

Thus, the thermal radiation between the thermal screen and the inductor structure 5 remains slight at the level of the middle plane, the corresponding thermal refrigeration power being minimized by the adopting of an optimum value of the maximum temperature in the middle plane of the thermal screen connected with the optimum position of the fixing of the rings 13 on the cylindrical portions 6.

We claim:

1. In a rotating electrical machine having a rotatable shaft and a rotor fixed to the shaft, and wherein the rotor includes an inner cryogenic cylindrical inductor structure thermally insulated from an outer non-cryogenic cylindrical member by a cylindrical space for holding a vacuum, said cryogenic inductor structure being mechanically connected in a fluid-tight manner to said non-cryogenic cylindrical member by two cylindrical portions subjected to a temperature gradient, thereby forming the cylindrical space; and a coaxial intermediate cylindrical thermal reflector screen disposed in the space and fixed at its opposite axial ends to said cylindrical portions by thermally conductive elements; the improvement wherein said screen comprises at least one layer of separate thermally conductive strips arranged parallel to one another between said opposite axial ends of said screen.

2. The improvement according to claim 1, characterized in that these strips are made of a metal chosen from the group constituted by copper and aluminium.

3. The improvement according to claim 1, characterized in that each of these strips is interrupted at a point along its length.

4. The improvement according to claim 1, characterized in that these strips are coated with a layer of enamel.

5. The improvement according to claim 1, characterized in that these strips have a width of 5 to 20 mm and a thickness of 1 to 3 mm.

6. The improvement according to claim 1, characterized in that these strips are parallel to the axis of the machine.

7. The improvement according to claim 1, characterized in that these strips are arranged in a helical configuration.

8. The improvement according to claim 7, characterized in that the pitch of the helix is, from one axial end to the other axial end of the reflector screen, at least equal to a polar pitch of the machine.

9. The improvement according to claim 1, characterized in that said strips are cemented to the inside of a cylindrical band.

10. The improvement according to claim 9, characterized in that the cylindrical band is made of stainless steel and that the strips are fixed by an electrically insulating cement.

11. The improvement according to claim 10, characterized in that the cylindrical band is made of a compound material formed by mechanically resistant fibres of a synthetic resin.

12. The improvement according to claim 1, characterized in that said strips are cemented together, an electrical insulation being inserted between them in the tangential direction, and said strips are held in the radial direction between two coaxial cylinders made of a compound material formed by mechanically resistant fibres and by a synthetic resin.

* * * * *